United States Patent [19]

Vor der Brück et al.

[11] 4,124,581
[45] Nov. 7, 1978

[54] DISAZO DYESTUFFS CONTAINING A THIAZOLE CENTRAL COMPONENT

[75] Inventors: Dieter Vor der Brück, Bonn; Gerhard Wolfrum, Leverkusen, both of Germany

[73] Assignee: Bayer Aktiengesellschaft, Leverkusen, Germany

[21] Appl. No.: 751,359

[22] Filed: Dec. 16, 1976

[30] Foreign Application Priority Data

Dec. 19, 1975 [DE] Fed. Rep. of Germany ....... 2557410

[51] Int. Cl.² .............. C09B 31/04; C09B 31/08; C09B 31/14; D06P 3/24
[52] U.S. Cl. .................................. 260/158; 260/156
[58] Field of Search ............................... 260/158

[56] References Cited

U.S. PATENT DOCUMENTS

| 3,134,761 | 5/1964 | Ackermann et al. | 260/146 T |
|---|---|---|---|
| 3,134,766 | 5/1964 | Merian et al. | 260/186 |

FOREIGN PATENT DOCUMENTS

| 910,385 | 11/1962 | United Kingdom | 260/158 |
|---|---|---|---|
| 1,186,753 | 4/1970 | United Kingdom | 260/158 |

Primary Examiner—Floyd D. Higel
Attorney, Agent, or Firm—Plumley and Tyner

[57] ABSTRACT

Dyestuffs of the formula

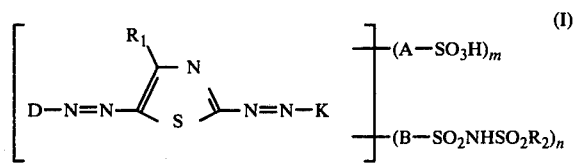

wherein
D represents the radical of an aromatic carbocyclic or heterocyclic diazo component,
K represents the radical of a carbocyclic or heterocyclic coupling component,
A and B represent a direct bond or a bridge member,
$R_1$ represents hydrogen, $C_1$-$C_4$-alkyl, optionally substituted phenyl or naphthyl, carbo-$C_1$-$C_4$-alkoxy, cyano or optionally substituted carboxamide,
$R_2$ represents $C_1$-$C_4$-alkyl or optionally substituted phenyl or naphthyl and
m and n represent 0, 1 or 2, and the sum of m and n denotes 1 or 2, are suitable for the dyeing of natural and synthetic fibre materials, particularly polyamide materials in level, violet to blue-green shades in good color yield and with good fastness properties.

6 Claims, No Drawings

DISAZO DYESTUFFS CONTAINING A THIAZOLE CENTRAL COMPONENT

The invention relates to disazo-thiazole dyestuffs which in the form of the free acid correspond to the formula

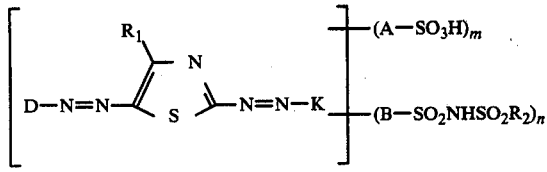

wherein
- D represents the radical of an aromatic carbocyclic or heterocyclic diazo component,
- K represents the radical of a carbocyclic or heterocyclic coupling component,
- A and B represent a direct bond or a bridge member,
- $R_1$ represents hydrogen, $C_1$-$C_4$-alkyl, optionally substituted phenyl or naphthyl, carbo-$C_1$-$C_4$-alkoxy, cyano or optionally substituted carboxamide,
- $R_2$ represents $C_1$-$C_4$-alkyl or optionally substituted phenyl or naphthyl and
- m and n represents 0, 1 or 2, and the sum of m and n denotes 1 or 2.

Suitable aromatic-carbocyclic diazo components D are those of the benzene and naphthalene series which can be substituted by halogen, cyano, carbo-$C_1$-$C_4$-alkoxy, trifluoromethyl, $C_1$-$C_4$-alkyl, $C_1$-$C_4$-alkoxy, hydroxyl, thiocyanato, $C_1$-$C_4$-alkylsulphonyl, phenyl, phenylsulphonyl, benzylsulphonyl, 2-phenylethylsulphonyl, phenoxy or optionally substituted carboxamide or sulphonamide.

Suitable heterocyclic diazo components are those of the thiazole, benzthiazole, thiadiazole, triazole, pyrazole or thiophene series, which can optionally be substituted by $C_1$-$C_4$-alkyl, phenyl, halogen, cyano, carbo-$C_1$-$C_4$-alkoxy, nitro or optionally substituted carboxamide.

Suitable carbocyclic and heterocyclic coupling components KH are those of the formulae given below

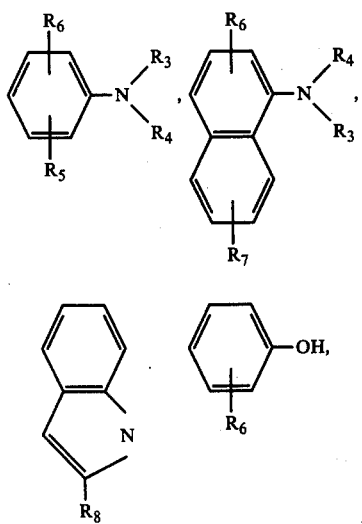

-continued

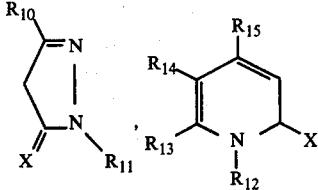

wherein
- $R_3$ and $R_4$ represent hydrogen, optionally substituted alkyl or optionally substituted aralkyl,
- $R_5$ represents hydrogen, $C_1$-$C_4$-alkyl $C_1$-$C_4$-alkoxy, halogen, $C_1$-$C_4$-alkylsulphonyl, benzylsulphonyl, phenethylsulphonyl, optionally substituted phenylsulphonyl, optionally substituted sulphonamide or carboxamide, carbo-$C_1$-$C_4$-alkoxy, $C_1$-$C_4$-alkylcarbonylamino, optionally substituted benzoylamino, $C_1$-$C_4$-alkylsulphonylamino or optionally substituted phenylsulphonylamino,
- $R_6$ represents hydrogen, $C_1$-$C_4$-alkyl, $C_1$-$C_4$-alkoxy, $C_1$-$C_4$-alkylcarbonylamino, optionally substituted benzoylamino, $C_1$-$C_4$-alkylsulphonylamino or optionally substituted phenylsulphonylamino,
- $R_7$ represents hydrogen, $C_1$-$C_4$-alkyl, $C_1$-$C_4$-alkoxy, halogen or cyano,
- $R_8$ represents hydrogen, $C_1$-$C_4$-alkyl or phenyl,
- $R_9$ represents hydrogen or $C_1$-$C_4$-alkyl which is optionally substituted by hydroxyl, cyano, carboxyl or carboxamide,
- $R_{10}$ represents hydrogen, $C_1$-$C_4$-alkyl, cyano, carbo-$C_1$-$C_4$-alkoxy, carboxamide or phenyl,
- $R_{11}$ represents hydrogen, $C_1$-$C_4$-alkyl or optionally substituted phenyl or naphthyl,
- $R_{12}$ represents hydrogen or $C_1$-$C_4$-alkyl,
- $R_{13}$ represents hydroxyl or $NHR_3$,
- $R_{14}$ represents cyano, optionally substituted carboxamide or carbo-$C_1$-$C_4$-alkoxy,
- $R_{15}$ represents hydrogen, $C_1$-$C_4$-alkyl, hydroxyl, carbo-$C_1$-$C_4$-alkoxy, phenyl or $NR_3R_4$ and
- X represents O or NH.

The sulphonic acid groups and sulphonylaminosulphonyl groups can be bonded via A and B, respectively, to the coupling component K, to the diazo component D or to the optionally substituted aryl radicals $R_1$.

Suitable bridge members A and B are O, O-alkylene, O-alkylene-O, alkylene, alkylene-$SO_2N$-$(R_{16})$-alkylene-O-, $SO_2$-N-$(R_{16})$-alkylene, $SO_2$-N-$(R_{16})$-arylene, $SO_2$-N-$(R_{16})$-arylene-$CH_2$ and $SO_2$-N-$(R_{16})$-alkylene-O, wherein
- $R_{16}$ denotes hydrogen or $C_1$-$C_4$-alkyl.

Examples of possible substituents of the phenyl and naphthyl radicals $R_1$, $R_2$ and $R_{11}$ and of the phenylsulphonyl, phenylsulphonylamino and benzoylamino radicals $R_5$ and $R_6$ are $C_1$-$C_4$-alkyl, nitro, halogen, $C_1$-$C_4$-alkoxy or phenyl.

Suitable substituents of the carboxamide and sulphonamide groups $R_1$, $R_5$ and $R_{14}$, and on D are $C_1$-$C_4$-alkyl, phenyl, benzyl or phenethyl, and the sulphonamide groups can be mono-substituted or disubstituted. The alkyl substituents can also, with inclusion of the nitrogen atom, form a piperidine, pyrrolidine or morpholine ring.

As halogen for $R_5$ and $R_7$, as a substituent on D or on the abovementioned phenyl and naphthyl radicals, chlorine and bromine should be mentioned particularly.

Possible substituents of the alkyl radicals $R_3$ and $R_4$ are especially chlorine, bromine, cyano, hydroxyl, $C_1$-$C_4$-alkoxy, benzyloxy, phenoxy, $C_1$-$C_4$-alkylcarbonyloxy, $C_1$-$C_4$-alkoxycarbonyloxy, $C_1$-$C_4$-alkoxycarbonyl, phenoxycarbonyloxy, phenylcarbonyloxy, $C_1$-$C_4$-alkylsulphonyl, benzylsulphonyl or phenylsulphonyl, the alkyl radicals preferably being unsubstituted or monosubstituted. The alkyl substituents can also, with inclusion of the nitrogen atom, form a piperidine, pyrrolidine or morpholine ring.

By optionally substituted aralkyl radicals there are in particular understood benzyl or phenethyl groups substituted by $C_1$-$C_4$-alkyl, $C_1$-$C_4$-alkoxy, chlorine, bromine or cyano.

Suitable alkylene groups in the bridge members are especially those with 2 to 4 C atoms, which can be straight-chain or branched. By arylene radicals in the bridge members there are preferably understood 1,2-, 1,3- or 1,4-phenylene radicals, and the phenylene radicals can be substituted further by $C_1$-$C_4$-alkoxy, $C_1$-$C_4$-alkyl, benzyloxy, chlorine, bromine, cyano or nitro.

Preferred dyestuffs correspond to the formula

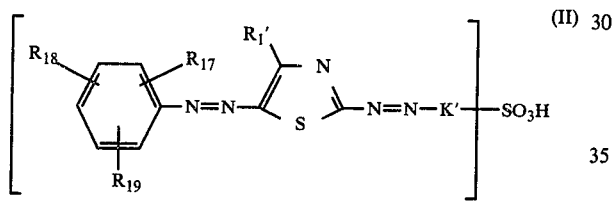

wherein
$R_1'$ denotes hydrogen, methyl, ethyl, or phenyl which is optionally substituted by chlorine, methyl, methoxy, ethoxy or nitro,
$R_{17}$ and $R_{18}$ denote hydrogen, chlorine, bromine, cyano,
$C_1$-$C_4$-alkyl, $C_1$-$C_4$-alkoxy, carboxamide or sulphonamide which are optionally monosubstituted or disubstituted by $C_1$-$C_4$-alkyl, $\beta$-hydroxyethyl, benzyl, phenyl or phenethyl, trifluoromethyl, phenoxy, $C_1$-$C_4$-alkylsulphonyl, phenylsulphonyl or benzylsulphonyl,
$R_{19}$ denotes hydrogen, $C_1$-$C_4$-alkyl, chlorine or bromine,
K' denotes the radical of one of the coupling components listed below

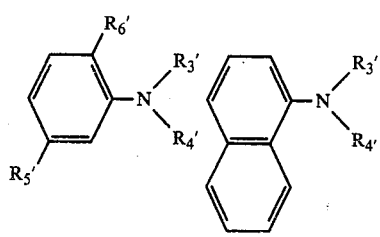

-continued

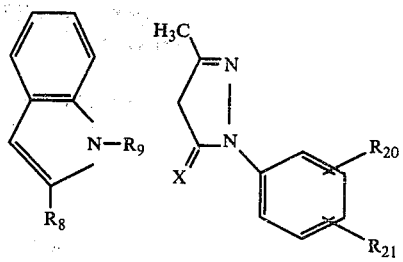

wherein
$R_3'$ and $R_4'$ denote $C_1$-$C_4$-alkyl which is optionally substituted by $C_1$-$C_4$-alkoxy, phenoxy, hydroxyl, cyano, chlorine, methylcarbonyloxy, ethylcarbonyloxy, methoxycarbonyloxy or ethoxycarbonyloxy, or denote benzyl or 2-phenylethyl,
$R_5'$ denotes hydrogen, methyl, ethyl, methoxy, ethoxy, chlorine or $C_1$-$C_3$-alkylcarbonylamino,
$R_6'$ denotes hydrogen, $C_1$-$C_4$-alkyl, $C_1$-$C_4$-alkoxy, chlorine or bromine, and
$R_{20}$ and $R_{21}$ denote hydrogen, $C_1$-$C_4$-alkyl, chlorine or bromine,
$R_8$, $R_9$ and X have the abovementioned meaning, and the sulpho group is bonded to a phenyl radical $R_1'$, to the naphthalene or indole system, to the phenyl substituent of the iminopyrazoline or pyrazolone ring or to a hydroxyalkyl group, alkyl group, benzyl group or 2-phenylethyl group, $R_3'$ or $R_4'$.

A particularly preferred group of these dyestuffs are those which in the form of the free acid correspond to the formula

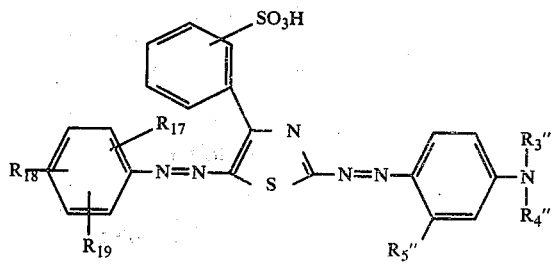

wherein
$R_{17}$, $R_{18}$ and $R_{19}$ have the abovementioned meaning,
$R_3''$ and $R_4''$ denote $C_1$-$C_4$-alkyl which is optionally substituted by hydroxyl, cyano, acetoxy, methoxycarbonyloxy or chlorine, or denote benzyl or phenethyl and
$R_5''$ denotes hydrogen, methyl, methoxy or acetylamino, and those which in the form of the free acid correspond to the formula

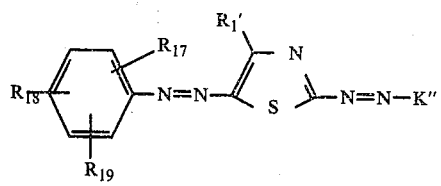

wherein
$R_{17}$, $R_{18}$, $R_{19}$ and $R_1'$ have the abovementioned meaning, and
K'' represents the radicals

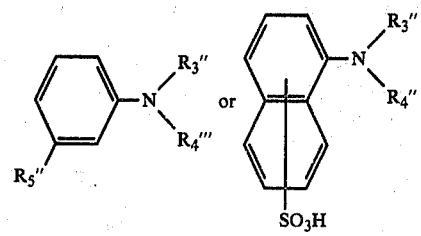 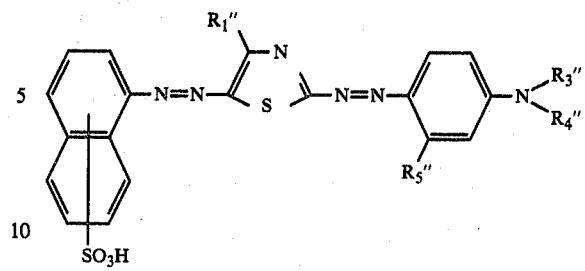

wherein
$R_3''$, $R_4''$ and $R_5''$ have the abovementioned meaning and $R_4'''$ represents a benzyl radical substituted by sulpho or a $C_1$-$C_4$-alkyl radical which is substituted by sulpho or sulphato and is optionally substituted further by methoxy, phenyl or phenoxy.

Further preferred dyestuffs are those which in the form of the free acid correspond to the formula

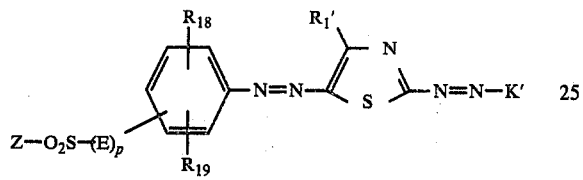

wherein
$R_1'$, $R_{18}$, $R_{19}$ and K' have the abovementioned meaning,

E represents $C_1$-$C_4$-alkylene, O-$C_2$-$C_4$-alkylene-O or $C_2$-$C_4$-alkylene-O, the alkylene radicals optionally being substituted by $C_1$-$C_4$-alkoxy, phenoxy or phenyl, p represents 0 or 1 and Z represents OH, NH-$SO_2$-$R_2'$, N-($R_{16}$)-$C_2$-$C_4$-alkylene-$SO_3$H or N-($R_{16}$)-phenylene-$SO_3$H, $R_{16}$ having the above-mentioned meaning, and $R_2'$ represents $C_1$-$C_4$-alkyl or phenyl which is optionally substituted by methyl or chlorine.

Particularly preferred dyestuffs are those which in the form of the free acid correspond to the formula

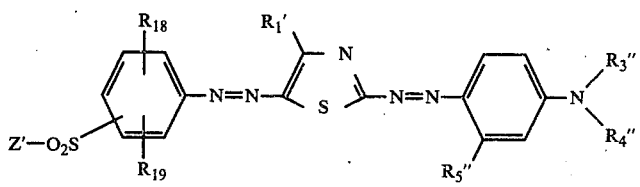

wherein
$R_3''$, $R_4''$, $R_5''$, $R_{18}$ and $R_{19}$ have the abovementioned meaning and Z' denotes OH, $CH_3$-$SO_2$-NH, phenyl-$SO_2$-NH, tolyl-$SO_2$NH or chlorophenyl-$SO_2$-NH and $R_1''$ represents H, $CH_3$ or phenyl.

Further preferred dyestuffs are those which in the form of the free acid correspond to the formula wherein
$R_1''$, $R_3''$, $R_4''$ and $R_5''$ have the abovementioned meaning.

The dyestuffs of the formula (I) are obtained by diazotising a diazo component of the formula

D - $NH_2$ wherein
D represents the radical of an aromatic carbocyclic or heterocyclic diazo component,
and coupling the product with a thiazole of the formula

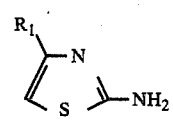

wherein
$R_1$ has the abovementioned meaning,
again diazotising the amino-monoazo dyestuff and coupling the product with a coupling component of the formula

K - H wherein
K represents the radical of a carbocyclic or heterocyclic coupling component,
and so choosing the components that they contain m groups (A-$SO_3$H) and n groups (B-$SO_2$NH-$SO_2R_2$), wherein
A, B, $R_2$, m and n have the abovementioned meanings.

Examples of amines suitable for use as diazo components are: 2-aminonaphthalene-1-sulphonic acid, 4-aminonaphthalene-1-sulphonic acid, 5-aminonaphthalene-1-sulphonic acid, 6-aminonaphthalene-1-sulphonic acid, 7-aminonaphthalene-1-sulphonic acid, 8-aminonaphthalene-1-sulphonic acid, 1-aminonaphthalene-2-sulphonic acid, 4-aminonaphthalene-2-sulphonic acid, 5-aminonaphthalene-2-sulphonic acid, 6-aminonaphthalene-2-sulphonic acid, 7-aminonaphthalene-2-sulphonic acid, 8-aminonaphthalene-2-sulphonic acid, 2-aminobenzenesulphonic acid, 4-chloro-2-aminobenzenesulphonic acid, aniline, 2-, 3- and 4-chloroaniline, 2,5-dichloroaniline, 2,4-dichloroaniline, 3-bromoaniline, 2-bromoaniline, 2-trifluoromethylaniline, 2-, 3- and 4-toluidine, 2-, 3- and 4-anisidine, 2-ethylaniline, 4-propoxyaniline, 4-benzylsulphonylaniline, 2-chloro-4-ethylsulphonylaniline, 2,5-dichloro-4-propylsulphonylaniline, aniline-4-N,N-dimethylsulphonamide, 2-chloroaniline-4-sulphonamide, 2-trifluoromethylaniline-4-N-benzylsulphonamide, 2,5-dichloroaniline-4-sulphonanilide, 2-chloroaniline-4-(2-methyl)-sulphonanilide, 2,5-dichloroaniline-4-N-hydroxypropylsulphonamide, 2-chloroaniline-4-N-cyclohexylsulphonamide-2-trifluoromethylaniline-4-N-methyl-N-phenylsulphonamide, 2-chloro-5-bromoaniline-4-N,N-dimethylsulphonamide, 2-chloro-6-methylaniline-4-N-methylsulphonamide, 2,5-dibromoaniline-4-N-benzylsulphonamide, aniline-4-sulphonic acid, 2-chloroaniline-4-sulphonic acid, 2,5-dichloroaniline-4-sulphonic acid, 2,5-dibromoaniline-4-sulphonic acid, 2-trifluoromethylaniline-5-sulphonic acid, 2-bromoaniline-4-sulphonic acid, 2,6-dibromoaniline-4-sulphonic acid, 2,6-dicyanoaniline-4-sulphonic acid, 2-trifluoromethyl-5-chloroaniline-4-sulphonic acid, 2-methylaniline-4-sulphonic acid, 3-methylaniline-4-sulphonic acid, 3-chloroaniline-5-sulphonic acid, 2,5-dimethoxyaniline-4-sulphonic acid, 1-aminonaphthalene-4-sulphonic acid, (3-amino-4-chlorobenzenesulphonyl)-methanesulphonamide, (3-amino-4-chlorobenzenesulphonyl)-butanesulphonamide, (3-amino-4-chlorobenzenesulphonyl)-o-toluenesulphonamide, (3-amino-4-chlorobenzenesulphonyl)-benzenesulphonamide, (3-amino-6-methylbenzenesulphonyl)-benzenesulphonamide, (3-amino-6-methoxybenzenesulphonyl)-butanesulphonamide, (4-aminobenzenesulphonyl)-p-toluenesulphonamide, (4-aminobenzenesulphonyl)-o-toluenesulphonamide, (4-aminobenzenesulphonyl)-methylsulphonamide, (4-aminobenzenesulphonyl)-butanesulphonamide, (4-amino-3-trifluoromethyl)-benzenesulphonyl)-benzenesulphonamide, (4-amino-3-trifluoromethyl)-benzenesulphonyl)-methanesulphonamide, (4-amino-3-trifluoromethyl)-benzenesulphonyl)-butanesulphonamide, (4-amino-3-trifluoromethyl-benzenesulphonyl)-p-toluenesulphonamide, (4-amino-4-trifluoromethyl-benzenesulphonyl)-o-toluenesulphonamide, (4-amino-3-trifluoromethyl-benzenesulphonyl)-2-naphthylsulphonamide, (4-amino-3-chlorobenzenesulphonyl)-benzenesulphonamide, (4-amino-3-chlorobenzenesulphonyl)-p-toluenesulphonamide, (4-amino-3-chlorobenzenesulphonyl)-methanesulphonamide, (4-amino-3-chlorobenzenesulphonyl)-dimethylaminosulphonamide, (4-amino-3-bromobenzenesulphonyl)-benzenesulphonamide, (4-amino-3-methylbenzenesulphonyl)-benzenesulphonamide, (4-amino-3-methylbenzenesulphonyl)-p-toluenesulphonamide, (4-amino-2,5-dichlorobenzenesulphonyl)-benzenesulphonamide, (4-amino-2,5-dichlorobenzenesulphonyl)-propanesulphonamide, (4-amino-2,5-dichlorobenzenesulphonyl)-p-toluenesulphonamide, (4-amino-2,5-dichlorobenzenesulphonyl)-dimethylaminosulphonamide, (4-amino-3,5-dichlorobenzenesulphonyl)-benzenesulphonamide, (4-amino-2-chloro-5-trifluoromethylbenzenesulphonyl)-benzenesulphonamide, (4-amino-2-chloro-5-trifluoromethyl-benzenesulphonyl)-methanesulphonamide, (4-amino-2-chloro-5-trifluoromethyl-benzenesulphonyl)-2-naphthylsulphonamide, (4-amino-2-trifluoromethyl-5-chlorobenzenesulphonyl)-benzenesulphonamide, (4-amino-2-trifluoromethyl-5-chlorobenzenesulphonyl)-2-naphthylsulphonamide, (4-amino-2-trifluoromethyl-5-bromobenzenesulphonyl)-butanesulphonamide, (4-amino-2-trifluoromethyl-benzenesulphonyl)-methanesulphonamide, (4-amino-2-trifluoromethyl-benzenesulphonyl)-butanesulphonamide, (4-amino-2-methyl-5-chlorobenzenesulphonyl)-p-toluenesulphonamide, (4-amino-2-methyl-5-chlorobenzenesulphonyl)-o-toluenesulphonamide, (4-amino-2,5-dibromobenzenesulphonyl)-benzenesulphonamide, (4-amino-2,5-dimethylbenzenesulphonyl)-butanesulphonamide, 2,4-dimethyl-5-sulpho-aniline, 4-ethoxy-5-sulpho-aniline, 4-phenoxy-5-sulphonaniline, N-(4-amino-phenylsulphonyl)-2-aminoethanesulphonic acid, N-methyl-N-(4-amino-phenylsulphonyl)-2-amino-ethanesulphonic acid, N-propyl-N-(4-amino-phenylsulphonyl)-2-amino-ethanesulphonic acid, N-(4-amino-2-chlorophenylsulphonyl)-2-amino-ethanesulphonic acid, N-ethyl-N-(4-amino-2-chlorophenylsulphonyl)-2-amino-ethanesulphonic acid, N-(4-amino-3-chlorophenylsulphonyl)-2-amino-ethanesulphonic acid, N-methyl-N-(4-amino-3-chlorophenylsulphonyl)-2-amino-ethanesulphonic acid, N-ethyl-N-(4-amino-3-chlorophenylsulphonyl)-2-amino-ethanesulphonic acid, N-(4-amino-2,5-dichlorophenylsulphonyl)-2-amino-ethanesulphonic acid, N-methyl-N-(4-amino-2,5-dichlorophenylsulphonyl)-2-amino-ethanesulphonic acid, N-ethyl-N-(4-amino-2,5-dichlorophenylsulphonyl)-2-amino-ethanesulphonic acid, N-(4-amino-3,5-dichlorophenylsulphonyl)-2-amino-ethanesulphonic acid, N-methyl-N-(4-amino-3,5-dichlorophenylsulphonyl)-2-amino-ethanesulphonic acid, N-(4-amino-phenylsulphonyl)-2-amino-ethanesulphonic acid, N-methyl-N-(4-amino-phenylsulphonyl)-2-amino-ethanesulphonic acid, N-(4-amino-2-chlorophenylsulphonyl)-2-amino-ethanesulphonic acid, N-ethyl-N-(4-amino-2-chlorophenylsulphonyl)-2-amino-ethanesulphonic acid, N-(4-amino-3-chlorophenylsulphonyl)-2-amino-ethanesulphonic acid, N-methyl-N-(4-amino-3-chlorophenylsulphonyl)-2-amino-ethanesulphonic acid, N-ethyl-N-(4-amino-3-chlorophenylsulphonyl)-2-amino-ethanesulphonic acid, N-(4-amino-2,5-dichlorophenylsulphonyl)-2-amino-ethanesulphonic acid, N-methyl-N-(4-amino-2,5-dichlorophenylsulphonyl)- 2-amino-ethanesulphonic acid, N-ethyl-N-(4-amino-2,5-dichlorophenylsulphonyl)-2-amino-ethanesulphonic acid, N-(4-amino-3,5-dichlorophenylsulphonyl)-2-amino-ethanesulphonic acid, N-methyl-N-(4-amino-3,5-dichlorophenylsulphonyl)-2-amino-ethanesulphonic acid, N-(4-amino-3-methylphenylsulphonyl)-2-amino-ethanesulphonic acid, N-(4-amino-3-methoxyphenylsulphonyl)-2-amino-ethanesulphonic acid, N-methyl-N-(4-amino-3-methoxyphenylsulphonyl)-2-amino-ethanesulphonic acid, N-(4-amino-3-trifluoromethylphenylsulphonyl)-2-amino-ethanesulphonic acid, N-methyl-N-(4-amino-3-trifluoromethylphenylsulphonyl)-2-aminoethanesulphonic acid, N-propyl-N-(4-amino-3-trifluoromethylphenylsulphonyl)-2-amino-ethanesulphonic acid, N-(4-aminophenylsulphonyl)-3-amino-propylsulphonic acid, N-methyl-N-(4-aminophenylsulphonyl)-3-amino-propylsulphonic acid, N-(4-amino-2-chlorophenylsulphonyl)-3-amino-propylsulphonic acid, N-(4-amino-2,5-dichlorophenylsulphonyl)-3-amino-propylsulphonic acid, N-(4-amino-3,5-dichlorophenylsulphonyl)-3-amino-propylsulphonic acid, N-propyl-N-(4-amino-3,5-dichlorophenylsulphonyl)-3-amino-propylsulphonic acid, N-(4-amino-3-trifluoromethylphenylsulphonyl)-3-amino-propylsulphonic acid, N-methyl-N-(4-amino-2,5-dichlorophenylsulphonyl)-3-amino-butylsulphonic acid, N-(4-amino-2,5-dichlorophenylsulphonyl)-3-amino-phenylsulphonic acid, N-(4-amino-3-trifluoromethylphenylsulphonyl)-3-aminophenylsulphonic acid, N-(4-amino-2,5-dichlorophenylsulphonyl)-4-amino-phenylsulphonic acid, N-methyl-N-(4-amino-2,5-dichlorophenylsulphonyl)-4-amino-phenylsulphonic acid, N-(4-amino-2,5-dichlorophenyl)-sulphonyl- 2-amino-ethyl sulphate, N-methyl-N-(4-amino-2,5-dichlorophenylsulphonyl)-2-amino-ethyl sulphate, N-ethyl-N-(4-amino-2-dichlorophenylsulphonyl)-2-amino-ethyl sulphate, N-(4-amino-phenylsulphonyl)-2-amino-ethyl sulphate, N-methyl-N-(4-amino-phenylsulphonyl)-2-amino-1-methyl ethyl sulphate, 4-(2-sulphatoethoxy)-aniline, 4-(2-sulphato-propoxy)-aniline, 4-(3-sulphato-4-phenoxy-n-butoxy)-aniline, 2-methyl-4-(2-sulphato-2-phenylethoxy)-aniline, 2-methyl-4-(3-sulphato-4-methoxy-n-butoxy)-aniline, 4-(2-sulphato-1,2-dimethylethoxy)-aniline, 3-(2-sulphato-3-ethoxy-propoxy)-aniline and 3-(2-sulphato-3-butoxy-propoxy)-aniline.

Examples of suitable thiazoles are: 2-aminothiazole, 2-amino-4-methyl-thiazole, 2-amino-4-phenyl-thiazole, 2-amino-4-ethyl-thiazole, 2-amino-4-(o-tolyl)-thiazole, 2-amino-4-(sulphophenyl)-thiazole, 2-amino-4-(4-nitrophenyl)-thiazole, 2-amino-4-(3-nitrophenyl)-thiazole, 2-amino-4-carbethoxythiazole and 2-amino-4-chlorothiazole.

Examples of suitable coupling components for the diazotised monoazo dyestuffs are: N,N-diethylaniline, N,N-dipropylaniline, N,N-dibutylaniline, 3-methyl-N,N-diethylaniline, 3-methyl-N-ethyl-N-(2-cyanoethyl)-aniline, 3-methyl-N-ethyl-N-(2-methyl-carbonyloxyethyl)-aniline, 3-methyl-N-(2-methyloxycarbonyloxyethyl)-N-ethyl-aniline, 3-ethyl-N,N-diethylaniline, 3-methyl-N,N-di-(2-ethoxycarbonyloxyethyl)-aniline, 3-methyl-N,N-di-(2-butoxycarbonyloxyethyl)-aniline, 2-acetylamino-N,N-diethylaniline, 2-acetylamino-N-ethyl-N-(2-ethoxycarbonyloxyethyl)-aniline, 3-acetylamino-N-ethyl-N-(2-cyanoethyl)-aniline, 3-acetylamino-N-(2-cyanoethyl)-N-(2-carbethoxycarbonyloxyethyl)-aniline, 3-(propylcarbonylamino)-N,N-diethylaniline, 3-(methylsulphonylamino)-N,N-diethylaniline, 3-(butylsulphonylamino)-N,N-diethylaniline, 3-(phenylsulphonylamino-N,N-diethylaniline, 3-acetylamino-6-ethoxy-N,N-diethylaniline, 3-acetylamino-6-methoxy-N,N-diethylaniline, 3-acetylamino-6-methoxy-N-ethyl-N-(2-cyanoethyl)-aniline, 3-acetylamino-6-methoxy-N,N-di-(2-ethoxycarbonyloxyethyl)-aniline, 3-chloro-N,N-diethylaniline, 3-chloro-N,N-dimethylaniline, 3-chloro-N-ethyl-N-(2-(cyanoethyl)-aniline, 2-carbamoyl-N,N-diethylaniline, 2-carbethoxy-N,N-diethylaniline, N-ethyl-N-(2-sulphoethyl)-aniline, 3-methyl-N-ethyl-N-(2-sulphoethyl)-aniline, 3-methyl-N-benzyl-N-(2-sulphoethyl)-aniline, 3-methyl-N-ethyl-N-(3-sulphobenzyl)-aniline, N-ethyl-N-(3-sulphobenzyl)-aniline, 3-methyl-N-methyl-N-(3-sulphobenzyl)-aniline, 3methoxy-N-ethyl-N-(3-sulphobenzyl)-aniline, 3-acetoamino-N-butyl-N-(3-sulphobenzyl)-aniline, 8-anilinonaphthalene-1-sulphonic acid, 8-p-toluidinonaphthalene-1-sulphonic acid, N,N-diethyl-8-aminonaphthalene-1-sulphonic acid, N,N-diethyl-5-aminonaphthalene-2-sulphonic acid, N-ethyl-N-(2-cyanoethyl)-5-aminonaphthalene-2-sulphonic acid, indole, 1-methylindole, 3-methylindole, 2-phenylindole, 2-ethylindole, 1-methyl-2-phenylindole, 2-phenylindolesulphonic acid, 1-methylindolesulphonic acid, 1-(2-hydroxypropyl)-2-methylindole, 1-(2-hydroxybutyl)-2-methylindole, 1-(2-hydroxy-2-phenylethyl)-2-methylindole, 1-(2-hydroxy-2-methyl-propyl)-2-methylindole, 1-(2-hydroxy-3-phenoxy-propyl)-2-methylindole, 1-(1-hydroxypropyl-2)-2-methylindole, 1-(2-hydroxypropyl)-2-phenylindole, 1-(2-hydroxy-butyl)-2-phenylindole, 1-(2-hydroxy-2-phenylethyl)-2-phenylindole, 1-(2-hydroxy-2-methyl-propyl)-2-phenylindole, 1-(2-hydroxy-3-phenoxy-propyl)-2-phenylindole, 1-(1-hydroxypropyl-2)-2-phenylindole, 1-(2-hydroxy-propyl)-2-methylindolesulphonic acid, 1-(2-hydroxy-butyl-2-methylindolesulphonic acid, 1-(2-hydroxy-2-phenylethyl)-2-methylindolesulphonic acid, 1-(2-hydroxy-2-methyl-propyl)-2-methylindolesulphonic acid, 1-(2-hydroxy-3-phenoxy-propyl)-2-methylindolesulphonic acid, 1-(1-hydroxy-propyl-2)-2-methylindolesulphonic acid, 1-(2-hydroxypropyl)-2-phenylindolesulphonic acid, 1-(2-hydroxybutyl)-2-phenylindolesulphonic acid, 1-(2-hydroxy-2-phenylethyl)-2-phenylindolesulphonic acid, 1-(2-hydroxy-2-methylpropyl)-2-phenylindolesulphonic acid, 1-(2hydroxy-3-phenoxy-propyl)-2-phenylindolesulphonic acid and 1-(1-hydroxypropyl-2)-2-phenylindolesulphonic acid.

3-Methyl-5-pyrazolone, 1-phenyl-3-methyl-5-pyrazolone, 1-(2-chlorophenyl)-3-methyl-5-pyrazolone, 1-(2,5-dichlorophenyl)-3-methyl-5-pyrazolone, 1-p-tolyl-3-ethyl-5-pyrazolone, 1-(3-sulphamoyl-phenyl)-3-methyl-5-pyrazolone, 1-(2-sulphophenyl)-3-methyl-5-pyrazolone, 1-(3-sulphophenyl)-3-methyl-5-pyrazolone, 1-(6-chloro-3-sulphophenyl)-3-methyl-5-pyrazolone, 1-(3-sulphophenyl)-5-amino-3-methylpyrazolone, 1-(4-sulphophenyl)-3-methyl-5-pyrazolone, 1-(2-chloro-4-sulphophenyl)-3-methyl-5-pyrazolone, 1-(2,5-dichloro-4-sulphophenyl)-3-methyl-5-pyrazolone, 1-(6-chloro-4-sulphone-2-methylphenyl)-3-methyl-5-pyrazolone, 1-(6-chloro-4sulpho-2-ethyl-phenyl)-5-amino-3-methylpyrazole, 1-(2-sulphophenyl)-5-amino-3-methylpyrazole, 1-(3-sulphophenyl)-5-amino-3-ethylpyrazole, 1-(4-sulphophenyl)-5-amino-3-methylpyrazole, 1-phenyl-3-methyl-5-aminopyrazole, 1-(2-sulphophenyl)-3-phenyl-5-pyrazolone, 1-phenyl-3-phenyl-5-pyrazolone, 1-(3-sulphophenyl)-3-(4-nitrophenyl)-5-pyrazolone, 1-phenyl-5-pyrazolone-3-carboxylic acid ethyl ester, 1-phenyl-5-pyrazolone-3-carboxylic acid amide, 1-(6-chloro-4-sulpho-2-methylphenyl)-5-pyrazolone-3-carboxylic acid ethyl ester, 1,4-dimethyl-5-cyano-2-hydroxy-6-pyridone, 1-propyl-4-methyl-5-cyano-2-hydroxy-6-pyridone, 1-butyl-4-ethyl-5-carbamoyl-2-hydroxy-6-pyridone, 1-ethyl-4-methyl-5-carbethoxy-2-hydroxy-6-pyridone, 1-methyl-4,5-dicarbomethoxy-2-hydroxy-6-pyridone and 1-propyl-2,4-dihydroxypyridione-6-pyridone.

The dyestuffs according to the invention can be used for dyeing natural and synthetic fibre materials, especially for dyeing polyamide in level, violet to blue-green shades of good colour yield and good fastness properties in use. They are absorbed well on polyamide even in a neutral to weakly acid dyebath. By polyamide fibres there are in particular to be understood, in this context, those of synthetic polyamides such as ε-polycaprolactam or condensation products of adipic acid and hexamethylenediamine.

EXAMPLE 1

3.5 g of 4-ethoxy-3-sulphoaniline and 1 g of $NaNO_2$ are together dissolved in 20 ml of 3% strength of sodium hydroxide solution. The solution is then poured onto 20 g of ice and 10 ml of concentrated hydrochloric acid and the mixture is stirred for a further 2 hours at 0° C.

2.6 g of 4-phenyl-2aminothiazole are dissolved in 25 ml of glacial acetic acid. This solution is allowed to run into 100 ml of saturated sodium acetate solution and 50 g of sodium acetate and 50 g of ice are added. The diazonium salt solution prepared above is rapidly poured in at 0° C. The dyestuff which has precipitated, of the formula

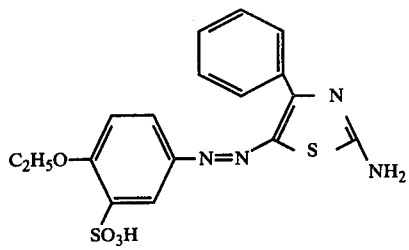

is filtered off, dried and then dissolved in 15 ml of dimethylformamide. The dyestuff solution is introduced into 50 ml of phosphoric acid and 30 ml of glacial acetic acid and is cooled to 5° C. Diazotisation is carried out with 5.6 ml of 40% strength nitrosylsulphuric acid. After 3 hours, 4 g of urea are added and 3.5 g of N-cyanoethyl-N-phenylethyl-m-toluidine dissolved in 30 ml of glacial acetic acid are then allowed to run into the diazonium salt solution.

The reaction mixture is introduced into 200 ml of saturated sodium acetate solution and 200 g of ice. The dyestuff which has precipitated, of the formula

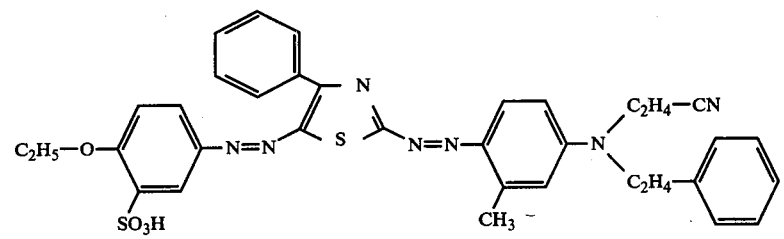

is filtered off and dried at 40° C.

DYEING EXAMPLE 0.1 g of dyestuff from Example 1 is dissolved in 100 ml of hot water. 5 ml of ammonium acetate solution are added and the mixture is diluted with water to a volume of 500 ml. 10 g of polyamide fibres are introduced into this dyebath, the dyebath is brought to the boil over the course of 20 minutes, 4 ml of 10% strength acetic acid are added and the bath is kept at this temperature for 1 hour. The fibres are then rinsed, and dried at 70° to 80° C. A dyeing in a greenish-tinged navy blue shade, having good fastness properties in use, is obtained.

EXAMPLE 2

2.3 g of 2,4-dichloroaniline are stirred into 70 ml of half-concentrated hydrochloric acid and 1 g of NaNO$_2$, dissolved in 10 ml of water, is added at 0° C. The mixture is stirred for a further 2 hours at 0° C.

2.6 g of 4-phenyl-2-aminothiazole are dissolved in 25 ml of glacial acetic acid. The solution is allowed to run into 100 ml of saturated sodium acetate solution and 50 g of sodium acetate and 50 g of ice are added. The diazonium salt solution prepared above is added rapidly at 0° C. The dye-stuff which has precipitated, of the formula

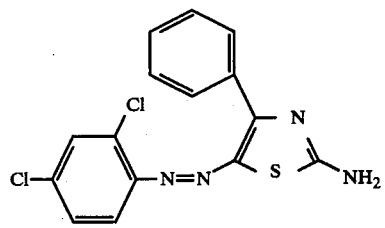

is filtered off and dried at 40° C. The finely ground dyestuff is dissolved in 20 ml of phosphoric acid and 20 ml of glacial acetic acid and 5.6 g of 40% strength natrosylsulphuric acid are added at 0° C. The mixture is then stirred for about 3 hours. Thereafter 4 g of urea are added to the diazonium salt solution, after which 3.5 g of N-ethyl-N-sulphobenzyl-m-toluidine, dissolved in 30 ml of glacial acetic acid, are added to the reaction mixture. The solution is stirred for a further 5 minutes and is then introduced into 200 ml of sodium acetate solution and 200 g of ice. The dyestuff which has precipitated, of the formula

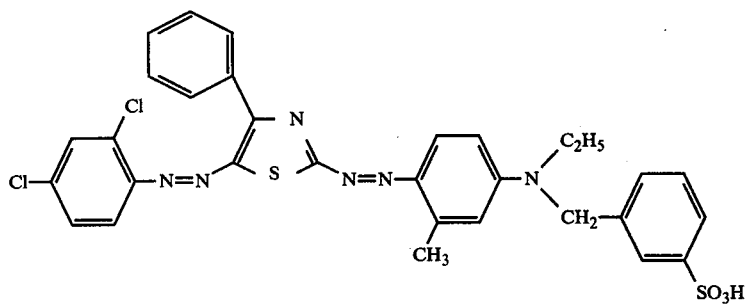

is filtered off and dried at 40° C.

The dyestuff dyes polyamide in a greenish-tinged navy blue colour shade.

If the procedure in Example 1 and 2 is followed, using the amines indicated in column 1 as a diazo component, 2-amino-4-phenylthiazole as the middle component and the compounds indicated in column 2 as the coupling component, water-soluble dyestuffs are obtained, which dye polyamide, from a weakly acid or neutral bath, in the light-fast colour shades which are indicated.

| | I | II | III |
|---|---|---|---|
| 3) | Metanilic acid | N-ethyl-N-cyanoethyl-m-toluidine | greenish-tinged blue |
| 4) | Metanilic acid | N-benzyl-N-cyanoethyl-m-toluidine | greenish-tinged blue |
| 5) | Metanilic acid | N,N-diethyl-m-toluidine | strongly greenish-tinged blue |
| 6) | Metanilic acid | N-ethyl-N-benzyl-m-toluidine | strongly greenish-tinged blue |
| 7) | Metanilic acid | N-ethyl-N-(2-acetoxy-ethyl)-m-toluidine | greenish-tinged blue |
| 8) | Metanilic acid | N-(2-cyanoethyl)-N-(2-phenylethyl)-m-toluidine | greenish-tinged blue |
| 9) | 4-Methyl-3-sulphoaniline | N-(2-cyanoethyl)-N-(2-phenethyl)-m-toluidine | greenish-tinged blue |
| 10) | 3-Sulpho-4-methylaniline | N-(2-methoxycarbonylethyl)-N-ethyl-3-methylaniline | greenish-tinged blue |
| 11) | 3-Sulpho-4-methylaniline | N-(2-cyanoethyl)-N-ethyl-3-methylaniline | greenish-tinged blue |
| 12) | 3-Sulpho-4,6-dimethylaniline | N-(2-cyanoethyl)-N-(2-phenylethyl)-3-methylaniline | greenish-tinged blue |
| 13) | 3-Sulpho-4,6-dimethylaniline | N-(2-cyanoethyl)-N-ethyl-3-methylaniline | greenish-tinged blue |
| 14) | 3-Sulpho-4,6-dimethylaniline | N-(2-methoxycarbonyloxyethyl)-N-ethyl-3-methylaniline | greenish-tinged blue |
| 15) | 3-Sulpho-4,6-dimethylaniline | N,N-diethyl-3-acetylaminoaniline | green-blue |
| 16) | 3-Sulpho-4,6-dimethylaniline | N-ethyl-N-benzyl-3-methylaniline | greenish-tinged blue |
| 17) | 3-Sulpho-4-ethoxyaniline | N-(2-methylsulphonylethyl)-N-ethyl-3-methylaniline | greenish-tinged blue |
| 18) | 3-Sulpho-4-ethoxyaniline | N-(2-acetoxyethyl)-N-ethyl-3-methylaniline | greenish-tinged blue |
| 19) | 3-Sulpho-4-ethoxyaniline | N-(2-cyanoethyl)-N-(2-hydroxyethyl)-3-methylaniline | greenish-tinged blue |
| 20) | 3-Sulpho-4-ethoxyaniline | N-(2-hydroxyethyl)-N-benzyl-3-methylaniline | greenish-tinged blue |
| 21) | 3-Sulpho-4-ethoxyaniline | N-(2-hydroxyethyl)-N-ethyl-3-methylaniline | greenish-tinged blue |
| 22) | 3-Sulpho-4-ethoxyaniline | N,N-di-(2-methoxycarbonyloxyethyl)-3-methylaniline | greenish-tinged blue |
| 23) | 3-Sulpho-4-ethoxyaniline | N-(2-cyanoethyl)-3-methylaniline | greenish-tinged blue |
| 24) | 3-Sulpho-4-ethoxyaniline | N-(2-phenylethyl)-3-methylaniline | greenish-tinged blue |
| 25) | 3-Sulpho-4-ethoxyaniline | N-ethyl-N-benzyl-3-methylaniline | greenish-tinged blue |
| 26) | 3-Sulpho-4-ethoxyaniline | N-(2-cyanoethyl)-N-ethyl-3-methylaniline | greenish-tinged blue |
| 27) | 3-Sulpho-4-ethoxyaniline | N-(2-cyanoethyl)-N-(2-acetoxyethyl)-3-methylaniline | greenish-tinged blue |
| 28) | 3-Sulpho-4-ethoxyaniline | N,N-diethyl-3-methoxyaniline | greenish-tinged blue |
| 29) | 3-Sulpho-4-ethoxyaniline | N,N-diethyl-3-acetylaminoaniline | green-blue |
| 30) | 3-Sulpho-4-ethoxyaniline | N-(2-cyanoethyl)-N-ethyl-3-methylaniline | greenish-tinged blue |
| 31) | 3-Sulpho-4-ethoxyaniline | N-(2-chloroethyl)-N-ethyl-3-methylaniline | greenish-tinged blue |
| 32) | 3-Sulpho-4-ethoxyaniline | N-(2-hydroxyethyl)-3-methylaniline | greenish-tinged blue |
| 33) | 3-Sulpho-4-ethoxyaniline | N-(2-hydroxyethyl)-N-benzyl-3-acetylamino-aniline | green-blue |
| 34) | 3-Sulpho-4-ethoxyaniline | N-benzyl-N-ethyl-3-acetylaminoaniline | green-blue |
| 35) | 2-Ethoxy-5-sulphoaniline | N-ethyl-N-benzyl-3-acetylaminoaniline | green-blue |
| 36) | 2-Ethoxy-5-sulphoaniline | N-(2-cyanoethyl)-N-ethyl-3-methylaniline | greenish-tinged blue |
| 37) | 2-Ethoxy-5-sulphoaniline | N-(2-cyanoethyl)-N-benzyl-3-methylaniline | greenish-tinged blue |
| 38) | 2-Ethoxy-5-sulphoaniline | N-(2-cyanoethyl)-N-(2-phenylethyl)-3-methylaniline | greenish-tinged blue |
| 39) | 2-Ethoxy-5-sulphoaniline | N-(2-acetoxyethyl)-N-ethyl-3-methylaniline | greenish-tinged blue |
| 40) | 2-Ethoxy-5-sulphoaniline | N-(2-cyanoethyl)-N-(2-acetoxyethyl)-3-methylaniline | greenish-tinged blue |
| 41) | 2-Ethoxy-5-sulphoaniline | N-(2-cyanoethyl)-N-(2-hydroxyethyl)-3-methylaniline | greenish-tinged blue |
| 42) | 2-Ethoxy-5-sulphoaniline | N-ethyl-N-benzyl-3-methylaniline | greenish-tinged blue |
| 43) | 2-Ethoxy-5-sulphoaniline | N-(2-methylsulphonylethyl)-N-ethyl-3-methylaniline | greenish-tinged blue |
| 44) | 2-Ethoxy-5-sulphoaniline | N,N-di-(2-methoxycarbonyloxyethyl)-3-methylaniline | greenish-tinged blue |
| 45) | 2-Ethoxy-5-sulphoaniline | N-(2-phenylethyl)-N-ethyl)-3-methylaniline | greenish-tinged blue |
| 46) | 2-Ethoxy-5-sulphoaniline | N-(2-p-methoxyphenylethyl)-N-ethyl-3-methylaniline | greenish-tinged blue |
| 47) | 2-Ethoxy-5-sulphoaniline | N-(2-phenylethyl)-aniline | greenish-tinged blue |
| 48) | 2-Ethoxy-5-sulphoaniline | N-(2-cyanoethyl)-3-methylaniline | greenish-tinged blue |
| 49) | 2-Ethoxy-5-sulphoaniline | N-(2-hydroxyethyl)-N-ethyl-3-methylaniline | greenish-tinged blue |
| 50) | 2-Ethoxy-5-sulphoaniline | N-(2-phenylsulphonylethyl)-N-ethyl-3-methylaniline | greenish-tinged blue |
| 51) | 2-Ethoxy-5-sulphoaniline | N-(2-chloroethyl)-N-ethyl-3-methylaniline | greenish-tinged blue |
| 52) | 2-Ethoxy-5-sulphoaniline | N,N-diethyl-3-acetylaminoaniline | greenish-tinged blue |
| 53) | 3-Sulpho-4-phenoxyaniline | N-(2-cyanoethyl)-N-ethyl-3-methylaniline | greenish-tinged blue |
| 54) | 3-Sulpho-4-phenoxyaniline | N-(2-phenylethyl)-N-ethyl-3-methylaniline | greenish-tinged blue |
| 55) | 3-Sulpho-4-phenoxyaniline | N-(2-phenylethyl)-N-(2-cyanoethyl)-3-methylaniline | greenish-tinged blue |
| 56) | 3-Sulpho-4-phenoxyaniline | N-(2-cyanoethyl)-N-benzyl-3-methylaniline | greenish-tinged blue |
| 57) | 3-Sulpho-4-phenoxyaniline | N-ethyl-N-benzyl-3-methylaniline | greenish-tinged blue |
| 58) | 3-Sulpho-4-phenoxyaniline | N-(2-acetoxyethyl)-N-ethyl-3-methylaniline | greenish-tinged blue |
| 59) | 3-Sulpho-4-phenoxyaniline | N-(2-methylsulphonylethyl)-N-ethyl-3-methylaniline | greenish-tinged blue |
| 60) | 3-Sulpho-4-phenoxyaniline | N-(2-hydroxyethyl)-N-(2-cyanoethyl)-3-methylaniline | greenish-tinged blue |
| 61) | 3-Sulpho-4-phenoxyaniline | N-(2-hydroxyethyl)-N-(2-phenylethyl)-3-methylaniline | greenish-tinged blue |
| 62) | 3-Sulpho-4-phenoxyaniline | N-(2-cyanoethyl)-N-ethylaniline | greenish-tinged blue |
| 63) | 3-Sulpho-4-phenoxyaniline | N-(2-cyanoethyl)-3-methylaniline | greenish-tinged blue |
| 64) | 3-Sulpho-4-phenoxyaniline | N-(2-phenylethyl)-3-methylaniline | greenish-tinged blue |
| 65) | 2-Methyl-5-sulphoaniline | N-(2-cyanoethyl)-N-ethyl-3-methylaniline | greenish-tinged blue |
| 66) | 2-Methyl-5-sulphoaniline | N-(2-cyanoethyl)-N-(2-phenylethyl)-3-methylaniline | greenish-tinged blue |

|   | I | II | III |
|---|---|---|---|
| 67) | 2-Methyl-5-sulphoaniline | N-(2-cyanoethyl)-N-benzyl-3-methylaniline | greenish-tinged blue |
| 68) | 2-Methyl-5-sulphoaniline | N-(2-hydroxyethyl)-N-(2-cyanoethyl)-3-methylaniline | greenish-tinged blue |
| 69) | 2-Methyl-5-sulphoaniline | N-(2-acetoxyethyl)-N-ethyl-3-methylaniline | greenish-tinged blue |
| 70) | 2-Methyl-5-sulphoaniline | N-ethyl-N-benzyl-3-methylaniline | greenish-tinged blue |
| 71) | 2-Methyl-5-sulphoaniline | N-(2-hydroxyethyl)-N-(2-phenylethyl)-3-methylaniline | greenish-tinged blue |
| 72) | 2-Methyl-5-sulphoaniline | N-(2-hydroxyethyl)-N-benzylaniline | greenish-tinged blue |
| 73) | 2-Methyl-5-sulphoaniline | N,N-diethyl-2-methyl-5-acetylaminoaniline | blue-green |
| 74) | 2-Methyl-5-sulphoaniline | N-(2-hydroxyethyl)-N-ethyl-3-acetylamino-aniline | blue-green |
| 75) | 2-Methyl-5-sulphoaniline | N-ethyl-N-benzyl-3-acetylaminoaniline | blue-green |
| 76) | 2-Methyl-4-sulphoaniline | N-ethyl-N-benzyl-3-methylaniline | greenish-tinged blue |
| 77) | 2-Methyl-4-sulphoaniline | N-(2-cyanoethyl)-N-(2-phenylethyl)-3-methylaniline | greenish-tinged blue |
| 78) | 2-Methyl-4-sulphoaniline | N-(2-cyanoethyl)-N-benzylaniline | greenish-tinged blue |
| 79) | 3-Amino-benzenesulphonic acid N-methyl-N-(2-sulphoethyl)-amide | N-(2-cyanoethyl)-N-ethyl-3-methylaniline | greenish-tinged blue |
| 80) | 3-Amino-benzenesulphonic acid N-methyl-N-(2-sulphoethyl)-amide | N-(2-chloroethyl)-N-(2-cyanoethyl)-aniline | greenish-tinged blue |
| 81) | 3-Amino-4-methylsulphonic acid N-(2-sulphoethyl)-amide | N-(2-hydroxyethyl)-N-(2-cyanoethyl)-3-ethylaniline | greenish-tinged blue |
| 82) | 3-Amino-4-methylsulphonic acid N-(2-sulphoethyl)-amide | N-(2-cyanoethyl)-N-(2-phenylethyl)-2-ethoxyaniline | greenish-tinged blue |
| 83) | 3-Amino-4-methylsulphonic acid N-(2-sulphoethyl)-amide | N-(2-acetoxyethyl)-N-(2-cyanoethyl)-2-methoxy-5-methylaniline | blue-green |
| 84) | 3-Amino-4-ethoxybenzene-sulphonic acid N-methyl-N-(2-sulphoethyl)-amide | 1-benzylaminonaphthalene | greenish-tinged blue |
| 85) | 3-Amino-4-ethoxybenzene-sulphonic acid N-methyl-N-(2-sulphoethyl)-amide | N-(2-cyanoethyl)-N-ethyl-3-methylaniline | greenish-tinged blue |
| 86) | 3-Amino-4-methoxybenzene-sulphonic acid N-methyl-N-(2-sulphoethyl)-amide | N-(2-cyanoethyl)-N-(2-phenylethyl)-3-methylaniline | greenish-tinged blue |
| 87) | 3-Amino-4-methoxybenzene-sulphonic acid N-methyl-N-(2-sulphoethyl)-amide | N,N-di-(2-ethoxycarbonyloxyethyl)-3-methylaniline | greenish-tinged blue |
| 88) | 3-Benzenesulphonylamino-sulphonylaniline | N,N-di-(2-ethoxycarbonyloxyethyl)-3-methylaniline | blue |
| 89) | 3-Benzenesulphonylamino-sulphonylaniline | N,N-diethyl-3-methylaniline | greenish-tinged blue |
| 90) | 3-Benzenesulphonylamino-sulphonylaniline | N-(2-cyanoethyl)-N-ethyl-3-methylaniline | greenish-tinged blue |
| 91) | 3-Benzenesulphonylamino-sulphonylaniline | N-(2-cyanoethyl)-N-(2-phenylethyl)-3-methylaniline | greenish-tinged blue |
| 92) | 3-Benzenesulphonylamino-sulphonylaniline | N-(2-cyanoethyl)-N-benzyl-3-methylaniline | greenish-tinged blue |
| 93) | 3-Benzenesulphonylamino-sulphonylaniline | 1-phenyl-3-methyl-5-pyrazolone | violet |
| 94) | 3-Benzenesulphonylamino-sulphonylaniline | 1-(2,5-dichlorophenyl)-3-methyl-5-pyrazolone | violet |
| 95) | 3-Benzenesulphonylamino-sulphonylaniline | 1-(2-methylphenyl)-3-methyl-5-pyrazolone | violet |
| 96) | 3-Methylsulphonylamino-sulphonylaniline | N-ethyl-N-(2-propylcarbonyloxyethyl)-3-methylaniline | greenish-tinged blue |
| 97) | 3-Methylsulphonylamino-sulphonylaniline | N-(2-cyanoethyl)-N-(2-phenylethyl)-3-methylaniline | greenish-tinged blue |
| 98) | 3-Methylsulphonylamino-sulphonylaniline | N-(2-cyanoethyl)-N-)2-hydroxyethyl)-3-methylaniline | greenish-tinged blue |
| 99) | 3-Methylsulphonylamino-sulphonylaniline | N-(2-cyanoethyl)-N-benzyl-3-methylaniline | greenish-tinged blue |
| 100) | 3-Methylsulphonylamino-sulphonylaniline | N-(2-cyanoethyl)-N-ethyl-3-methylaniline | greenish-tinged blue |
| 101) | 3-Methylsulphonylamino-sulphonylaniline | 2-phenylindole | violet |
| 102) | 2-Ethoxy-5-(2-methylphenyl)-sulphonylamino-sulphonyl-aniline | 2-phenylindole | violet |
| 103) | 2-Ethoxy-5-(2-methylphenyl)-sulphonylamino-sulphonyl-aniline | N-(2-cyanoethyl)-N-(2-hydroxyethyl)-3-methylaniline | greenish-tinged blue |
| 104) | 2-Ethoxy-5-(2-methylphenyl)-sulphonylamino-sulphonyl-aniline | N-(2-cyanoethyl)-N-(2-phenylethyl)-3-methylaniline | greenish-tinged blue |
| 105) | 2-Ethoxy-5-(2-methylphenyl)-sulphonylamino-sulphonyl-aniline | m-cresol | violet |
| 106) | 2-Ethoxy-5-(2-methylphenyl)-sulphonylamino-sulphonyl-aniline | o-cresol | violet |
| 107) | 2-Ethoxy-5-phenylsulphonyl-amino-sulphonylaniline | N-(2-cyanoethyl)-N-(2-phenylethyl)-3-methylaniline | greenish-tinged blue |
| 108) | 2-Ethoxy-5-phenylsulphonyl-amino-sulphonylaniline | N-ethyl-N-(2-hydroxyethyl)-3-methylaniline | greenish-tinged blue |
| 109) | 2-Ethoxy-5-phenylsulphonyl-amino-sulphonylaniline | N-(2-cyanoethyl)-N-(2-hydroxyethyl)-3-methylaniline | greenish-tinged blue |
| 110) | 2-Ethoxy-5-phenylsulphonyl- | N-ethyl-N-(2-cyanoethyl)-3-methylaniline | greenish-tinged blue |

-continued

| | I | II | III |
|---|---|---|---|
| | amino-sulphonylaniline | | |
| 111) | 2-Ethoxy-5-phenylsulphonyl-amino-sulphonylaniline | m-cresol | violet |
| 112) | 2-Ethoxy-5-phenylsulphonyl-amino-sulphonylaniline | p-cresol | violet |
| 113) | 2-Ethoxy-5-phenylsulphonyl-amino-sulphonylaniline | 1,4-dimethyl-2-hydroxy-5-cyano-6-pyridone | violet |
| 114) | 2-Ethoxy-5-phenylsulphonyl-amino-sulphonylaniline | 1-propyl-2-hydroxy-4-methyl-5-cyano-6-pyridone | violet |
| 115) | 2-Methyl-5-(4-chlorophenyl)-sulphonylamino-sulphonyl-aniline | 1-phenyl-2-hydroxy-4-ethyl-5-cyano-6-pyridone | violet |
| 116) | 2-methyl-5-(4-chlorophenyl)-sulphonylamino-sulphonyl-aniline | 2-hydroxy-4-methyl-dimethylaminocarbonyl-6-pyridone | violet |
| 117) | 2-Methyl-5-phenylsulphonyl-aminosulphonylaniline | N-butyl-N-(2-cyanoethyl)-3-methylaniline | greenish-tinged blue |
| 118) | 2-Methyl-5-phenylsulphonyl-aminosulphonylaniline | N-(2-cyanoethyl)-N-(2-phenylethyl)-3-methylaniline | greenish-tinged blue |
| 119) | 2-Methyl-5-phenylsulphonyl-aminosulphonylaniline | N-ethyl-N-(2-acetoxyethyl)-aniline | greenish-tinged blue |
| 120) | 2-Methyl-5-phenylsulphonyl-aminosulphonylaniline | N-propyl-N-benzyl-3-methylaniline | greenish-tinged blue |
| 121) | 2-Methyl-5-phenylsulphonyl-aminosulphonylaniline | N,N-diethyl-3-methylsulphonylaminoaniline | strongly greenish-tinged blue |
| 122) | 2-Methyl-5-phenylsulphonyl-aminosulphonylaniline | N-ethyl-N-(2-hydroxyethyl)-3-phenyl-sulphonylaminoaniline | strongly greenish-tinged blue |
| 123) | 4-Phenylsulphonylamino-sulphonylaniline | 1-phenyl-3-methyl-5-aminopyrazole | blue-violet |
| 124) | 4-Phenylsulphonylamino-sulphonylaniline | 1-(4-chlorophenyl)-3-ethyl-5-aminopyrazole | blue-violet |
| 125) | 2-Methyl-4-phenylsulphonyl-aminosulphonylaniline | N,N-di-(2-cyanoethyl)-3-butyrylaminoaniline | green-blue |
| 126) | 2-Methyl-4-phenylsulphonyl-aminosulphonylaniline | N-ethyl-N-(2-hydroxyethyl)-2,5-dimethyl-aniline | strongly greenish-tinged blue |
| 127) | 3-Sulpho-4-(2-nitrophenoxy)aniline | N-ethyl-N-benzyl-3-ethoxyaniline | greenish-tinged blue |
| 128) | 3-Sulpho-4-(2-ethylphenoxy)-aniline | N,N-diethyl-3-benzoylaminoaniline | green-blue |
| 129) | 2-Chloro-5-sulphoaniline | 1-(2-methyl-5-chlorophenyl)-3-ethyl-5-aminopyrazole | violet |
| 130) | 2,5-Dichloro-4-sulphoaniline | 1-(2,4-dichlorophenyl)-3-methyl-5-aminopyrazole | violet |
| 131) | 2-Bromo-5-sulphoaniline | N-ethyl-N-benzylaniline | greenish-tinged blue |
| 132) | 2-Chloro-5-phenylsulphonyl-aminosulphonylaniline | N-ethyl-N-(2-cyanoethyl)-3-methylaniline | greenish-tinged blue |
| 133) | 4-(2-Sulphatoethyoxy)-aniline | N-ethyl-N-(2-cyanoethyl)-3-methylaniline | greenish-tinged blue |
| 134) | 2-Methyl-4-(2-sulphato-propoxy)-aniline | N,N-dibenzyl-3-methylaniline | greenish-tinged blue |
| 135) | 2-Chloro-4-(2-sulphato-butoxy)-aniline | N-(2-cyanoethyl)-N-(4-methoxybenzyl)-3-methylaniline | greenish-tinged blue |
| 136) | 4-(2-Sulphato-2-phenyl-ethoxy)-aniline | N-(2-cyanoethyl)-N-(4-methoxybenzyl)-3-methylaniline | greenish-tinged blue |
| 137) | 2-Bromo-5-(2-sulphato-ethoxy)-aniline | N-benzyl-N-(2-hydroxyethyl)-3-methylaniline | greenish-tinged blue |
| 138) | 2-Methoxy-5-(2-sulphato-2-phenylethoxy)-aniline | N-ethyl-N-(3-nitrobenzyl)-3-methylaniline | greenish-tinged blue |
| 139) | 1-Amino-8-sulphonaphthalene | N-(2-cyanoethyl)-N-(2-phenylethyl)-3-methylaniline | green-blue |
| 140) | 1-Amino-6-sulphonaphthalene | N-(2-chloroethyl)-N-(2-cyanoethyl)-3-methylaniline | greenish-tinged blue |
| 141) | 1-Amino-6-sulphonaphthalene | 1-phenyl-3-methyl-pyrzolone | blue-violet |
| 142) | 1-Amino-6-sulphonaphthalene | N,N-diethyl-3-propionyl-aminoaniline | green-blue |
| 143) | 1-Amino-4-sulphoaniline | N,N-diethyl-2-methylaniline | green-blue |
| 144) | 2-Methyl-4-chloroaniline | N-ethyl-N-(3-sulphobenzyl)-3-methylaniline | greenish-tinged blue |
| 145) | 2,4-Dichloroaniline | N-ethyl-N-(3-sulphobenzyl)-3-methylaniline | greenish-tinged blue |
| 146) | 2-Chloro-4-ethoxyaniline | N-ethyl-N-(3-sulphobenzyl)-3-methylaniline | greenish-tinged blue |
| 147) | 3-Phenylaminosulphonyl-aniline | N-ethyl-N-(3-sulphobenzyl)-3-methylaniline | greenish-tinged blue |
| 148) | 3-Diethylaminosulphonyl-aniline | N-ethyl-N-(3-sulphobenzyl)-3-methylaniline | greenish-tinged blue |
| 149) | 2-Ethoxy-5-diethylamino-sulphonylaniline | N-ethyl-N-(3-sulphobenzyl)-3-methylaniline | greenish-tinged blue |
| 150) | 2-Ethoxy-5-diethylamino-sulphonylaniline | N-ethyl-N-(3-sulphobenzyl)-3-methylaniline | greenish-tinged blue |
| 151) | 3-Dipropylaminosulphonyl-4-ethylaniline | N-benzyl-N-(2-sulphoethyl)-3-methylaniline | greenish-tinged blue |
| 152) | 3-(2-phenylethylamino)-sulphonyl-4-propoxyaniline | N-benzyl-N-(2-sulphoethyl)-3-methylaniline | greenish-tinged blue |
| 153) | 4-Methylsulphonylaniline | N-benzyl-N-(2-sulphoethyl)-3-methylaniline | greenish-tinged blue |
| 154) | 2-Ethoxy-4-diethylamino-sulphonylaniline | N-benzyl-n-(2-sulphoethyl)-3-methylaniline | greenish-tinged blue |
| 155) | 2-Trifluoromethyl-4-chloroaniline | N-benzyl-N-(2-sulphoethyl)-3-methylaniline | greenish-tinged blue |
| 156) | 2-Propoxy-5-phenylamino-sulphonylaniline | 1-(4-methylphenylamino)-8-sulphonaphthalene | blue-green |
| 157) | 4-Sulphomethylaniline | N-ethyl-N-(2-cyanoethyl)-3-methylaniline | greenish-tinged blue |
| 158) | 4-Sulphomethylaniline | N-ethyl-N-(2-hydroxyethyl)-2,5-dimethyl-aniline | greenish-tinged blue |
| 159) | 4-Sulphomethylaniline | N-(2-cyanoethyl)-N-(2-phenylethyl)-3-methylaniline | greenish-tinged blue |
| 160) | 4-Sulphomethylaniline | N-benzyl-N-(2-cyanoethyl)-3-methylaniline | greenish-tinged blue |
| 161) | 4-Sulphomethylaniline | N-ethyl-N-(2-acetoxyethyl)-3-methylaniline | greenish-tinged blue |

-continued

| | I | II | III |
|---|---|---|---|
| 162) | 4-Sulphomethylaniline | N-(2-cyanoethyl)-N-(2-hydroxyethyl)-3-methylaniline | greenish-tinged blue |
| 163) | 3-Sulphomethylaniline | N-(2-cyanoethyl)-N-(2-hydroxyethyl)-3-methylaniline | greenish-tinged blue |
| 164) | 3-Sulphomethylaniline | N-ethyl-N-benzyl-3-methylaniline | greenish-tinged blue |
| 165) | 3-Sulphomethylaniline | N-ethyl-N-(2-phenylethyl)-methylaniline | greenish-tinged blue |
| 166) | 3-Sulphomethylaniline | N-(2-cyanoethyl)-N-(2-phenylethyl)-3-methylaniline | greenish-tinged blue |

If the procedure followed is as in Example 1 and 2, the amines indicated in column 1 of the table which follows are used as the diazo component, 2-amino-4-(x-sulphophenyl)-thiazole, which is obtained by sulphonation of 2-amino-4-phenylthiazole in accordance with customary methods, and the sulphonation position of which is not precisely established, is used as the middle component, and the compounds indicated in column 2 of the table which follows are used as the coupling component, further water-soluble dyestuffs are obtained, which dye polyamide from a weakly acid or neutral bath in the colour shades indicated.

EXAMPLE 190

If the procedure followed is as in Example 1, using 2-sulpho-4-amino-2'-chlorodiphenyl as the diazo component, 2-amino-4-(3-nitrophenyl)-thiazole as the middle component and N,N-diethyl-2,5-dimethoxyaniline as the coupling component, a water-soluble dyestuff, which dyes polyamide greenish-tinged blue from a weakly acid bath, is obtained.

EXAMPLE 191

If the procedure followed is as in Example 1, using

| | I | II | III |
|---|---|---|---|
| 167) | 2,5-Dichloroaniline | N,N-diethyl-3-methylaniline | greenish-tinged blue |
| 168) | 3-Diethylaminosulphonylaniline | N-ethyl-N-(2-chloroethyl)-3-methylaniline | greenish-tinged blue |
| 169) | 3-Phenylaminosulphonylaniline | N-ethyl-N-(2-chloroethyl)-3-methylaniline | greenish-tinged blue |
| 170) | 3-Phenylaminosulphonylaniline | N-(2-cyanoethyl)-N-(2-phenylethyl)-3-methylaniline | greenish-tinged blue |
| 171) | 3-Phenylaminosulphonylaniline | N-benzyl-N-(2-cyanoethyl)-3-methylaniline | greenish-tinged blue |
| 172) | 3-Phenylaminosulphonyl)-aniline | N-ethyl-N-benzyl-3-methylaniline | greenish-tinged blue |
| 173) | 3-Aminosulphonylaniline | N-ethyl-N-(2-cyanoethyl)-3-methylaniline | greenish-tinged blue |
| 174) | 2-Methyl-5-diethylaminosulphonylaniline | N-ethyl-N-(2-cyanoethyl)-3-methylaniline | greenish-tinged blue |
| 175) | 3-Dimethylaminosulphonyl-4-methylaniline | N-ethyl-N-benzyl-3-methylaniline | greenish-tinged blue |
| 176) | 2-Methoxy-5-diethylaminosulphonylaniline | N,N-di-(2-acetoxyethyl)-3-methylaniline | greenish-tinged blue |
| 177) | 3-Diethylaminosulphonyl-4-ethoxyaniline | N,N-di-(2-acetoxyethyl)-methylaniline | greenish-tinged blue |
| 178) | 2-Ethoxy-5-diethylaminosulphonylaniline | N-(2-cyanoethyl)-N-(2-phenylethyl)-3-methylaniline | greenish-tinged blue |
| 179) | 3-Benzylaminosulphonyl-4-chloroaniline | N-(2-cyanoethyl)-N-(2-phenylethyl)-3-methylaniline | greenish-tinged blue |
| 180) | 3-Methylsulphonylaniline | N-(2-cyanoethyl)-N-(2-phenylethyl)-3-methylaniline | greenish-tinged blue |
| 181) | 4-Phenylsulphonylaniline | N-ethyl-N-(2-cyanoethyl)-2-methyl-5-ethoxy-aniline | strongly greenish-tinged blue |
| 182) | 4-Ethylsulphonylaniline | N-ethyl-N-benzyl-2-methyl-5-ethylaniline | strongly greenish-tinged blue |
| 183) | 4-N-Methyl-N-benzylaminosulphonylaniline | N-ethyl-N-(2-hydroxyethyl)-3-methylaniline | greenish-tinged blue |
| 184) | 3-(2-phenylethyl)-aminosulphonyl-4-phenoxyaniline | N-ethyl-N-(2-hydroxyethyl)-3-methylaniline | greenish-tinged blue |
| 185) | 2,4-Dichloroaniline | N-ethyl-N-(2-hydroxyethyl)-3-methylaniline | greenish-tinged blue |
| 186) | 2-Bromo-4-methylaniline | N-ethyl-N-(2-cyanoethyl)-3-chloroaniline | greenish-tinged blue |
| 187) | 2,6-Dichloroaniline | N-benzyl-3-methylaniline | greenish-tinged blue |
| 188) | 2-Methyl-4-chloroaniline | N-(2-cyanoethyl)-N-(2-hydroxyethyl)-3-methylaniline | greenish-tinged blue |

EXAMPLE 189

If the procedure followed is as in Example 1, using 2-sulpho-4-aminodiphenyl as the diazo component, 2-amino-4-(2-methylphenyl)-thiazole as the middle component and N,N-diethyl-2,5-diethoxyaniline, a water-soluble dyestuff, which dyes polyamide greenish-tinged blue, is obtained.

If, in Example 189, the coupling component is replaced by N-ethyl-N-(2-cyanoethyl)-2-methyl-5-ethoxyaniline, a dyestuff which dyes polyamide greenish-tinged blue is obtained.

2-sulpho-4-amino-4'-methoxydiphenyl as the diazo component, 2-amino-4-(4-methoxyphenyl)-thiazole as the middle component and N,N-diethyl-2-methoxy-5-butyrylaminoaniline as the coupling component, a dyestuff which dyes polyamide greenish-tinged blue is obtained.

EXAMPLE 192

Using 2-sulpho-4-amino-2'-nitrodiphenyl as the diazo component, 2-amino-4-(4-ethoxyphenyl)-thiazole as the middle component and N,N-diethylaniline as the coupling component, and following the procedure of Example 1, a dyestuff which dyes polyamide greenish-tinged blue is obtained.

EXAMPLE 193

Analogously to Example 1, a dyestuff which dyes polyamide a greenish-tinged blue is obtained when 2-sulpho-4-amino-4'-chlorodiphenyl oxide is used as the diazo component, 2-amino-4-(4-chlorophenyl)-thiazole as the middle component and N,N-diethylaniline as the coupling component.

pounds indicated in column 2 of the table which follows as the coupling component, water-soluble dyestuffs, which dye polyamide, from a weakly acid or neutral bath, in the colour shades indicated, are obtained.

|  | I | II | III |
|---|---|---|---|
| 196) | 2-Ethoxy-5-sulphoaniline | N-ethyl-N-(2-cyanoethyl)-3-methylaniline | reddish-tinged blue |
| 197) | 2-Ethoxy-5-sulphoaniline | N-benzyl-N-(2-cyanoethyl)-3-methylaniline | reddish-tinged blue |
| 198) | 2-Ethoxy-5-sulphoaniline | N-(2-cyanoethyl)-N-(2-phenylethyl)-3-methylaniline | reddish-tinged blue |
| 199) | 3-Sulpho-4-ethoxyaniline | N-(2-cyanoethyl)-N-(2-phenylethyl)-3-methylaniline | reddish-tinged blue |
| 200) | 3-Sulpho-4-ethoxyaniline | N-ethyl-N-(2-cyanoethyl)-3-methylaniline | reddish-tinged blue |
| 201) | 3-Sulpho-4-ethoxyaniline | 1-ethylaminoaniline | reddish-tinged blue |
| 202) | 3-Sulpho-4-ethoxyaniline | 1-benzylaminonaphthalene | greenish-tinged blue |
| 203) | 2,4-Dimethyl-5-sulphoaniline | N-ethyl-N-(2-acetoxyethyl)-3-methylaniline | reddish-tinged blue |
| 204) | 3-Sulpho-4-methylaniline | N-ethyl-N-benzyl-3-methylaniline | reddish-tinged blue |
| 205) | 2-Methyl-5-sulphoaniline | N-(2-hydroxyethyl)-N-2-cyanoethyl)-3-methylaniline | reddish-tinged blue |
| 206) | 2-Ethoxy-5-phenylsulphonyl-aminosulphonyaniline | N-ethyl-N-[2-(2-chlorophenyl)-ethyl]-3-methylaniline | reddish-tinged blue |
| 207) | 2-Ethyl-5-ethylsulphonyl-aminosulphonylaniline | N-propyl-N-[2-(2-methylphenyl)-ethyl]-3-methylaniline | reddish-tinged blue |
| 208) | 3-Phenylsulphonylamino-sulphonyl-4-methoxyaniline | N-propyl-N-[2-(2-methylphenyl)-ethyl]-3-methylaniline | reddish-tinged blue |
| 209) | 4-[N-Ethyl-N-(2-sulpho-ethyl)-aminosulphonyl]-aniline | N-(2-cyanoethyl)-N-(2-hydroxypropyl)-3-ethylaniline | reddish-tinged blue |
| 210) | 3-Sulpho-4-chloroaniline | N-(2-phenylethyl)-N-(2-phenyl-2-hydroxy-ethyl)-3-methylaniline | reddish-tinged blue |
| 211) | 2-Methyl-5-(2-sulphato-3-phenoxypropoxy)-aniline | N-ethyl-N-(2-cyanoethyl)-3-methylaniline | reddish-tinged blue |
| 212) | 2-Ethyl-4-diethylamino-sulphonylaniline | N-benzyl-N-(2-sulphoethyl)-3-methylaniline | reddish-tinged blue |
| 213) | 2-Chloro-4-cyanoaniline | N-benzyl-N-(2-sulphoethyl)-3-methylaniline | reddish-tinged blue |
| 214) | 3-Diethylaminocarbonyl-aniline | N-benzyl-N-(2-sulphoethyl)-3-methylaniline | reddish-tinged blue |
| 215) | 3-Phenylsulphonylaniline | N-benzyl-N-(2-sulphatoethyl)-3-methylaniline | reddish-tinged blue |
| 216) | 2-Ethylsulphonylaniline | N-ethyl-N-(2-sulphatopropyl)-3-methylaniline | reddish-tinged blue |
| 217) | 4-Benzylsulphonylaniline | N-(2-cyanoethyl)-N-(1-methyl-2-sulphato-propyl)-aniline | reddish-tinged blue |
| 218) | 2-Trifluoromethyl-4-methyl-sulphonylaniline | N-ethyl-N-(2-phenyl-2-sulphatoethyl)-3-methylaniline | reddish-tinged blue |
| 219) | 2-Ethoxy-5-butylsulphonyl-aniline | N-(2-phenylethyl)-N-(2-sulphato-3-methoxy-propyl)-2-methoxy-5-methylaniline | reddish-tinged blue |
| 220) | 4-Acetylaminoaniline | N-butyl-N-(2-sulphato-3-phenoxypropyl)-3-ethylaniline | reddish-tinged blue |
| 221) | 2-Methyl-5-(2-phenylethyl)-aminosulphonylaniline | N-ethyl-N-(3-sulphobenzyl)-3-acetylamino-aniline | reddish-tinged blue |

EXAMPLE 194

If, in Example 193, the coupling component is replaced by 1-(2-cyanoethyl)-aminonaphthalene, a dyestuff which dyes polyamide green-blue from a weakly acid or neutral bath is obtained.

EXAMPLE 195

If the procedure of Example 1 is followed using 2-sulpho-4-amino-4'-ethoxydiphenyl oxide as the diazo component, 2-amino-4-(2-methoxyphenyl)-thiazole as the middle component and N-ethyl-N-(2-cyanoethyl)-3-methylaniline as the coupling component, a water-soluble dyestuff which dyes polyamide greenish-tinged blue, is obtained.

If the procedure followed is as in Example 1 and 2, using the amines indicated in column 1 of the formula which follows as the diazo component, 2-amino-4-methylthiazole as the middle component and the com-

EXAMPLE 222

If the procedure followed is as indicated in Example 1, using 2,6-dichloroaniline as the diazo component, 2-aminothiazole as the middle component and 1-phenylamino-8-sulphonaphthalene as the coupling component, a water-soluble dye-stuff, which dyes polyamide blue from a weakly acid or neutral bath, is obtained.

EXAMPLE 223

A further blue polyamide dyestuff is obtained in accordance with the instructions of Example 1, using 2-methoxy-5-chloroaniline as the diazo component, 2-aminothiazole as the middle component and 6-diethylamino-3-sulphoaniline as the coupling component.

If the procedure followed is as in Example 1, using the amines indicated in column 1 of the formula which follows as the diazo component, 2-amino-4-ethyl-thiazole as the middle component and the compounds indicated in column 2 of the table which follows as the coupling component, water-soluble dye-stuffs, which dye polyamide, from a weakly acid or neutral bath, in the colour shades indicated, are obtained.

|  | I | II | III |
|---|---|---|---|
| 224) | 2,5-Dichloro-4-(2-sulphato-ethoxy)-aniline | N,N-diethyl-2,5-dimethylaniline | reddish-tinged blue |
| 225) | 3-Methyl-4-(2-sulphato-3-methoxypropoxy)-aniline | N-(2-hydroxyethyl)-N-benzyl-2,5-dimethylaniline | reddish-tinged blue |
| 226) | 2,6-Dimethyl-4-(2-sulphato- | N-(2-cyanoethyl)-N-(2-hydroxyethyl)- | reddish-tinged blue |

-continued

| | I | II | III |
|---|---|---|---|
| | 3-ethoxypropoxy)-aniline | 3-ethoxyaniline | |
| 227) | 2-Methoxy-5-methylsulphonyl-aniline | 1-(3-sulphophenyl)-3-ethyl-5-aminopyrazole | violet |
| 228) | 2-Ethoxy-5-propylsulphonyl-aniline | 2-phenyl-x-sulphoindole | violet |
| 229) | 2-Ethyl-5-propylsulphonyl-aniline | 1,2-dimethyl-x-sulphophenyl-indole | violet |
| 230) | 3-Propylaminosulphonyl-4-methylaniline | 2-methyl-x-sulphoindole | violet |
| 231) | 2-Chloro-4-methyl-5-dibutyl-aminosulphonylaniline | 1-(3-sulphophenyl)-3-methyl-5-aminopyrazole | violet |
| 232) | 3-Diethylcarbonylaniline | 1-(2,5-dichloro-4-sulphophenyl)-3-methyl-5-pyrazolone | violet |
| 233) | 3-Chloro-4-(2-sulphato-ethoxy)-aniline | N-propyl-N-(2-cyanoethyl)-3-methylaniline | reddish-tinged blue |
| 234) | 3-Bromo-4-(2-sulphato-propoxy)-aniline | 1-ethylaminonaphthalene | blue |
| 235) | 3-Chloro-4-(1-methyl-2-sulphatopropoxy)-aniline | 1-ethylaminonaphthalene | blue |
| 236) | 3-Chloro-5-(1-methyl-2-sulphatopropyl)-aniline | N-(2-cyanoethyl)-N-(2-acetoxyethyl)-3-methylaniline | reddish-tinged blue |
| 237) | 4-(1-Methyl-2-sulphato-3-phenoxypropoxy)-aniline | N-(2-cyanoethyl)-N-(2-acetoxyethyl)-3-methylaniline | reddish-tinged blue |
| 238) | 1-Amino-5-sulphonaphthalene | N-(2-cyanoethyl)-N-(2-acetoxyethyl)-3-methylaniline | blue |

We claim:

1. Disazo-thiazole dyestuff, which in the form of the free acid corresponds to the formula

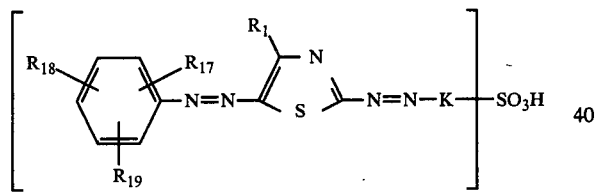

wherein
$R_1$ denotes hydrogen, methyl, ethyl, phenyl, or phenyl substituted by chlorine, methyl, methoxy, ethoxy or nitro;
$R_{17}$ and $R_{18}$ denotes hydrogen, chlorine, bromine, cyano, $C_1$-$C_4$-alkyl, $C_1$-$C_4$-alkoxy, trifluoromethyl, phenoxy, $C_1$-$C_4$-alkylsulphonyl, phenylsulphonyl, benzylsulphonyl, carboxamide, sulphonamide, mono- or di-substituted carboxamide, or mono- or di-substituted sulphonamide wherein the substituents are $C_1$-$C_4$-alkyl, $\beta$-hydroxyethyl, benzyl, phenyl or phenethyl;
$R_{19}$ denotes hydrogen, $C_1$-$C_4$-alkyl, chlorine or bromine;
K denotes

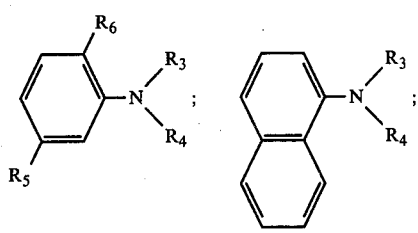

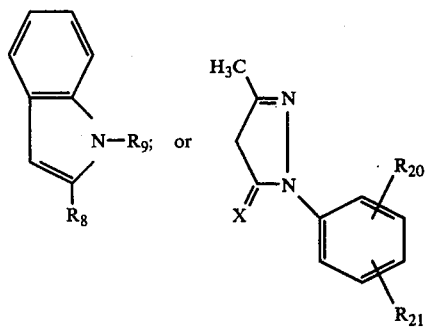

wherein
$R_3$ and $R_4$ denote $C_1$-$C_4$-alkyl, benzyl, 2-phenylethyl, or $C_1$-$C_4$-alkyl which is substituted by $C_1$-$C_4$-alkoxy, phenoxy, hydroxyl, cyano, chlorine, methylcarbonyloxy, ethylcarbonyloxy, methoxycarbonyloxy or ethoxycarbonyloxy;
$R_5$ denotes hydrogen, methyl, ethyl, methoxy, ethoxy, chlorine or $C_1$-$C_3$-alkylcarbonylamino;
$R_6$ denotes hydrogen, $C_1$-$C_4$-alkyl, $C_1$-$C_4$-alkoxy, chlorine or bromine;
$R_{20}$ and $R_{21}$ denote hydrogen, $C_1$-$C_4$-alkyl, chlorine or bromine;
$R_8$ denotes hydrogen, $C_1$-$C_4$-alkyl, or phenyl; and
$R_9$ denotes hydrogen, $C_1$-$C_4$-alkyl, or $C_1$-$C_4$-alkyl substituted by hydroxyl, cyano, carboxyl, or carboxamide.

2. Disazo-thiazole dyestuffs according to claim 1 which in the form of the free acid corresponds to the formula

[Structure: phenyl-SO₃H on top, connected to vinyl carbon with R₁₇, then N=N to phenyl with R₁₈, R₁₉; thiazole-S with N=N to phenyl with R₃/R₄ amino, R₅]

wherein $R_{17}$, $R_{18}$, and $R_{19}$ have the meaning indicated in claim 1;

$R_3$ and $R_4$ denote $C_1$-$C_4$-alkyl, benzyl, phenethyl, or $C_1$-$C_4$-alkyl which is substituted by hydroxyl, cyano, acetoxy, methoxycarbonyloxy or chlorine; and $R_5$ denotes hydrogen, methyl, methoxy or acetylamino.

3. Disazo-thiazole dyestuff which in the form of the free acid corresponds to the formula

[Structure with R₁₈, R₁₇, R₁₉ substituted phenyl-N=N-thiazole-N=N-K]

wherein $R_{17}$, $R_{18}$, $R_{19}$ and $R_1$ have the meaning indicated in claim 1 and K represents the radicals

[Two structures: phenyl-NR₃R₄ with R₅, or naphthyl-NR₃R₄ with SO₃H]

wherein $R_3$ and $R_4$ denote $C_1$-$C_4$-alkyl, benzyl, phenethyl, or $C_1$-$C_4$-alkyl which is substituted by hydroxyl, cyano, acetoxy, methoxycarbonyloxy, or chlorine;

$R_5$ denotes hydrogen, methyl, methoxy, or acetylamino; and $R_4'$ denotes benzyl, sulphobenzyl, sulpho-$C_1$-$C_4$-alkyl, sulphato-$C_1$-$C_4$-alkyl, or substituted sulpho- or sulphato-$C_1$-$C_4$-alkyl where the substituent is methoxy, phenyl or phenoxy.

4. Disazo-thiazole dyestuff according to claim 1, which in the form of the free acid corresponds to the formula

[Structure with Z-O₂S-(E)ₚ, R₁₈, R₁₉, R₁, N=N-K']

wherein $R_1$, $R_{18}$, $R_{19}$ and K' have the meaning indicated in claim 1

E represents $C_1$-$C_4$-alkylene, O-$C_2$-$C_4$-alkylene-O or $C_2$-$C_4$-alkylene-O, where alkylene is unsubstituted or substituted by $C_1$-$C_4$-alkoxy, phenoxy, or phenyl;

p represents 0 or 1 and

Z represents OH, NH-SO$_2$-R$_2'$, N-(R$_{16}$)-C$_2$-$C_4$-alkylene-SO$_3$H or N-(R$_{16}$)-phenylene-SO$_3$H;

$R_2'$ represents $C_1$-$C_4$-alkyl or phenyl which is optionally substituted by methyl or chlorine; and $R_{16}$ denotes hydrogen or $C_1$-$C_4$-alkyl.

5. Disazo-thiazole dyestuff which in the form of the free acid corresponds to the formula

[Structure with Z·O₂S, R₁₈, R₁₉, R₁, thiazole, N=N-phenyl-NR₃R₄, R₅]

wherein $R_3$, $R_4$, $R_5$, $R_{18}$ and $R_{19}$ have the meaning mentioned in claim 2;

Z denotes OH, CH$_3$-SO$_2$NH, phenyl-SO$_2$NH, tolyl-SO$_2$-NH, or chlorophenyl-SO$_2$-NH; and $R_1$ represents H, CH$_3$, or phenyl.

6. Disazo-thiazole dyestuff which in the form of the free acid corresponds to the formula

[Structure: naphthyl with SO₃H, N=N, R₁-thiazole, N=N-phenyl-NR₃R₄, R₅]

wherein $R_1$, $R_3$, $R_4$ and $R_5$ have the meaning indicated in claim 5.

* * * * *